United States Patent [19]

Piestert et al.

[11] Patent Number: 5,611,956
[45] Date of Patent: Mar. 18, 1997

[54] TWO COMPONENT POLYURETHANE SEALANT

[75] Inventors: Gerhard Piestert, Schwetzingen; Bodo Müller, Würzburg, both of Germany

[73] Assignee: Bostik, Inc., Middleton, Mass.

[21] Appl. No.: 980,665

[22] Filed: Nov. 24, 1992

Related U.S. Application Data

[62] Division of Ser. No. 758,876, Sep. 10, 1991, Pat. No. 5,194,488.

[30] Foreign Application Priority Data

Sep. 10, 1990 [DE] Germany .......................... 40 28 704.1

[51] Int. Cl.$^6$ .......................... C08K 5/053; C08K 13/02; C08K 5/10; C08B 30/12
[52] U.S. Cl. .................. 252/182.32; 252/194; 127/29; 127/32; 127/33
[58] Field of Search .................... 252/182.32, 194, 252/182.24; 127/29, 32, 33

[56] References Cited

U.S. PATENT DOCUMENTS

| | | | |
|---|---|---|---|
| 3,341,488 | 9/1967 | O'Connor | 524/405 |
| 3,567,692 | 3/1971 | Haggis et al. | 528/64 |
| 3,620,899 | 11/1971 | Kelly et al. | 156/328 |
| 3,767,422 | 10/1973 | Levitz | 426/152 |
| 3,779,794 | 12/1973 | De Santis | 428/429 |
| 3,800,808 | 4/1974 | Reynolds et al. | 131/267 |
| 3,870,609 | 3/1975 | Schirmer | 264/22 |
| 3,950,593 | 4/1976 | Bomball et al. | 428/476 |
| 4,009,317 | 2/1977 | Chase et al. | 428/378 |
| 4,025,688 | 5/1977 | Nagy et al. | 428/350 |
| 4,029,626 | 6/1977 | Gillemot et al. | 524/773 |
| 4,076,846 | 2/1978 | Nakatsuka et al. | 426/62 |
| 4,079,025 | 3/1978 | Young et al. | 536/111 |
| 4,115,332 | 9/1978 | Young et al. | 536/111 |
| 4,192,783 | 3/1980 | Bomball et al. | 106/130 |
| 4,192,937 | 3/1980 | Noll et al. | 528/59 |
| 4,218,350 | 8/1980 | Griffin | 264/137 |
| 4,231,803 | 11/1980 | Bovier et al. | 106/213 |
| 4,336,166 | 6/1982 | Penczuk et al. | 524/53 |
| 4,341,689 | 7/1982 | Doshi et al. | 528/48 |
| 4,347,272 | 8/1982 | Schmidt | 428/40 |
| 4,469,857 | 9/1984 | John | 528/59 |
| 4,518,718 | 5/1985 | Frost | 521/122 |
| 4,536,012 | 8/1985 | Hume, III | 427/262 |
| 4,670,271 | 6/1987 | Pasternak | 426/90 |
| 4,673,438 | 6/1987 | Wittwer et al. | 106/126 |
| 4,681,805 | 7/1987 | Puckett | 428/391 |
| 4,702,496 | 10/1987 | Hume, III | 412/8 |
| 4,720,519 | 1/1988 | Orywol et al. | 524/450 |
| 4,726,809 | 2/1988 | DeBoer et al. | 536/45 |
| 4,735,811 | 4/1988 | Skarra et al. | 426/128 |
| 4,738,724 | 4/1988 | Wittwer et al. | 106/213 |
| 4,826,535 | 5/1989 | Godly | 106/209 |
| 4,913,969 | 4/1990 | Schulte et al. | 428/420 |
| 4,935,243 | 6/1990 | Borkan et al. | 424/441 |
| 4,977,908 | 12/1990 | Luke | 131/375 |
| 5,091,055 | 2/1992 | Fredenucci et al. | 162/135 |
| 5,120,363 | 6/1992 | Puckett | 106/213 |
| 5,194,488 | 3/1993 | Piestert et al. | 524/703 |
| 5,221,546 | 6/1993 | Moore et al. | 426/275 |
| 5,234,977 | 8/1993 | Bastioli et al. | 524/47 |
| 5,286,770 | 2/1994 | Bastioli et al. | 524/52 |

FOREIGN PATENT DOCUMENTS

| | | |
|---|---|---|
| 0351728 | 1/1990 | European Pat. Off. . |
| 371370 | 6/1990 | European Pat. Off. . |
| 1393412 | 2/1965 | France . |
| 2200268 | 7/1972 | Germany . |
| 2403656 | 10/1975 | Germany . |
| 2605192 | 9/1976 | Germany . |
| 1104831 | 2/1968 | United Kingdom . |
| 8300154 | 1/1983 | WIPO . |

OTHER PUBLICATIONS

Sax et al.; *Hawley's Condensed Chemical Dictionary, Eleventh Edition;* Van Nostrand Reinhold; New York; 1987; pp. 219, 672, 945, 1163, and 1243.

Rombauer et al.; *Joy of Cooking;* The Bobbs–Merrill Company, Inc; Indianapolis, Indiana; Jan., 1967; p. 320.

*Primary Examiner*—James J. Seidleck
*Assistant Examiner*—Rabon Sergent
*Attorney, Agent, or Firm*—David G. Conlin; Peter F. Corless

[57] ABSTRACT

Two-component polyurethane sealants, in particular for the direct glazing of motor vehicles, comprising (A) a pasty polyurethane component containing a polyurethane prepolymer having free isocyanate groups, and a curing agent, and (B) a pasty water-containing component, component (A) containing a blocked curing agent which can be liberated by water, and component (B) containing the water, reversibly bonded to a carrier substance which liberates the watering a delayed manner after components (A) and (B) have been mixed.

9 Claims, No Drawings

TWO COMPONENT POLYURETHANE SEALANT

This is a divisional of application Ser. No. 07/758,876 filed on Sep. 10, 1991, now U.S. Pat. No. 5,194,488.

BACKGROUND OF THE INVENTION

The invention relates to 2-component polyurethane sealants, in particular for the direct glazing of motor vehicles, comprising (A) a pasty polyurethane component containing a polyurethane prepolymer having free isocyanate groups, and a curing agent, and (B) a pasty water-containing component. Two-component sealants have been disclosed in GB-A-1 104 831 and EP-A-371 370.

A fundamental problem of previous sealants is that, on the one hand, the processing of pot time must be sufficiently long to ensure flawless processing of the sealant before it cures, but, on the other hand, the curing must, for obvious reasons, take place as rapidly as possible when processing is complete. Finally, the polyurethane component A must also have adequate shelf life.

Although previous 2-component polyurethane sealants mentioned at the outset have sufficient strength, for example, one hour after mixing, the processing time is, however, too short, which means problems can arise even during mixing of components A and B due to premature gelling of the sealants.

SUMMARY OF THE INVENTION

In accordance with the present invention, it has been found that a particularly favorable behavior with respect to processing time and curing rate is obtained in 2-component polyurethane sealants if component B contains water reversibly bonded to a carrier substance, which liberates the water in a delayed manner after components A and B have been mixed.

DETAILED DESCRIPTION OF THE INVENTION

The invention accordingly provides 2-component polyurethane sealants, in particular for the direct glazing of motor vehicles, comprising (A) a pasty polyurethane component containing a polyurethane prepolymer having free isocyanate groups, and a curing agent, and (B) a pasty water-containing component, which are characterised in that component (A) contains a blocked curing agent which can be liberated by water, and component (B) contains the water, reversibly bonded to a carrier substance which liberates the water in a delayed manner after components (A) and (B) have been mixed.

As shown by the examples and comparative example below, the sealants according to the invention have on the one hand an entirely adequate processing time or gelling time of from 20 to 30 minutes, while, on the other hand, a shear strength of at least 0.2 N/mm$^2$ after one hour and a final shear strength of about 4 N/mm$^2$ after only 4 hours.

In component B, the carrier substance ensures that the water is not immediately available to component A for reaction with the isocyanate groups or for liberation of the curing agent bonded to the molecular sieve, but instead delayed liberation of the water takes place, which results in an extension of the processing time.

Suitable carrier substances for binding the water in component B are all substances which are capable of reversibly binding water and liberating the water in a delayed manner after components A and B have been mixed. Examples of preferred carrier substances are ground cellulose, starch and cork. Pyrogenic silica is less suitable.

The carrier substance is preferably finely particulate, so that, for example, at least 50% of the particles have a size of less than 40 μm. Examples of suitable commercial products are type XX-01 cellulose powder from Mikro-Technik in Burstatt/Miltenberg or native potato starch from Merck.

Ground cellulose and starch are capable of reversibly binding water up to a maximum ratio by weight of 1:1.

In a preferred embodiment, the carrier substance which contains the water in reversibly bonding form is dispersed in an inert viscous liquid in order to achieve the desired pasty consistency. Suitable viscous liquids here are in principle all those which do not react, in particular, with the isocyanate groups of the polyurethane prepolymer of component A and also have no other disadvantageous effects on the cured sealant.

The inert viscous liquids are preferably plasticizers for the cured sealant, preference being given in turn to alkylsulphonic acid esters of phenol or cresol and benzyl butyl phthalate.

Examples of suitable commercial products are MESAMOLL® (alkylsulphonic acid ester of phenol) from Bayer AG or ACTREL 400 (product of the addition reaction of methylstyrene and bicyclic, partially hydrogenated aromatics) from Esso.

Furthermore, component B preferably contains a thixotrophic agent, with carbon black being particularly preferred.

It is also possible to additionally add polyols to component B. This has the advantage of increasing the initial strength of the sealant. In a particular embodiment, component B therefore also contains a polyol. A suitable commercial product is VORANOL® cp/450 (polyoxypropylenetriol, MW about 450) from DOW.

Component B may contain further conventional additives and processing assistants, such as antioxidants, dyes, pigments, fillers or wetting agents.

In a preferred embodiment, component B contains a wetting agent. Wetting agents contribute to compatibility and thus improve the smoothness. Preferred examples of suitable wetting agents are sorbitan monolaurate (for example the commercial product SPAN 20® from FLUKA AG) and polyoxyethylene (10) oleyl alcohol (for example BRIJ 96® from ICI).

Finally, component B, in a further preferred embodiment, contains an aromatic solvent, preferably toluene or xylene.

Suitable polyurethane prepolymers are known to persons skilled in the art. These prepolymers contain terminal free isocyanate groups, which are capable of reacting both with the curing agent present in component A and with the water introduced through component B, with enlargement of the molecule and curing. This involves the following reactions occurring simultaneously. Firstly, delayed successive liberation of water from component B takes place. The water liberates the blocked curing agent, and the latter reacts with the polyurethane prepolymer; however, the water can also react directly with the isocyanate groups.

The curing agent of component A is preferably an at least difunctional primary or secondary amine. A preferred difunctional primary amine is ethylenediamine.

The curing agent is preferably blocked by being bonded to a molecular sieve. In a further embodiment, omitting the molecular sieve, the curing agent employed is an at least difunctional amine in which the amine functions have been chemically blocked by conversion into enamines or ketimines. It is furthermore possible according to the invention, again with omission of the molecular sieve, for the curing agents employed to be oxazolidines, which are per se difunctional, chemically blocked curing agents which can be liberated by water.

In a further preferred embodiment, component A contains a thixotropic agent, with carbon black being particularly preferred.

In the sealants according to the invention, the curing rate can be controlled, within certain limits which are of practical importance, by means of the carrier substance: water ratio. In general, a ratio of from 1:0.25 to 1:1 is used.

Although the isocyante groups of the polyurethane prepolymer are also capable of reacting with the water of atmospheric moisture, the principal reaction, due to early shear strength which is desired, is the crosslinking reaction with the water liberated from the carrier substance of component B or with the curing agent in component A liberated from the molecular sieve by this water. The ratios can be selected so that there is either a stoichiometric excess or a substoichiometric amount of free NCO groups relative to the reactive groups present in the water and the curing agent. The latter case is preferred since it results in more rapid curing.

Both component A and component B are in pasty form, i.e. are not free-flowing.

In addition to the pasty consistency of components A and B, the non-Newtonian properties (thixotropic behavior) also play a part since both the pasty consistency and the non-Newtonian properties effect the mixing behavior of the components. Control is in each case effected through the choice of the type and amount of the inert viscous liquid and of the thixotrophic agent.

In general, components B contains the carrier substance and water in approximately equal parts by weight, but, depending on the requirements, the amount of water may also be very much lower. As far as the amount of component B relative to component A is concerned, the molar amount of water in component B and of curing agent in component A on the one hand and the free isocyanate groups in component A on the other hand must in turn be taken into account, preference being given, a stated above, to a substoichiometric amount of NCO.

In the sealants according to the invention, component A contains from 20 to 80 parts by weight, preferably from 35 to 55 parts by weight, most preferably from 40 to 45 parts by weight, based on 100 parts by weight of component A, of the polyurethane prepolymer, and from 20 to 120 eq-%, preferably from 40 to 80 eq-%, in each case based on the number of equivalents of isocyanate in the prolyurethane prepolymer, of the curing agent. Since, in the case of curing agents bonded to molecular sieve, all the curing agents should be bonded to molecular sieve, all the curing agent should be bonded, the amount of molecular sieve depends on the amount of curing agent. In general, from 5000 to 400 parts by weight, preferably from 1250 to 700 parts by weight, of molecular sieve, based on 100 parts by weight of curing agent in component A, are present for this purpose. If component A contains a thixotropic agent, it is present in such amounts that the material is firm and not free-flowing. In the case of carbon black, amounts of about 7 parts by weight per 100 parts by weight of component A are generally necessary for this purpose.

Component B contains the carrier substance in an amount sufficient for complete binding of the water. The ratio by weight between the carrier substance and water is generally from 1:0.25 to 1:1, preferably from 1:0.5 to 1:0.8. The carrier substance (with the water bonded thereto) is preferably dispersed in an inert viscous liquid. If component B contains a thixotropic agent, for example carbon black, this is preferably present in such amounts that a pasty consistency is produced. To this end, amounts of 7–15% by weight, based on component B, are generally sufficient. If component B contains a polyol, this is preferably present in amounts of 10–100 meq of OH. If component B contains an aromatic solvent, this is preferably present in amount of 2–10% by weight, based on component B.

The invention furthermore relates to a process for mixing components A and B according to the present invention using a static mixer, which process is characterised in that components A and B are employed in a ratio by volume of at least 2:1, and a static mixer is used which has only from 15 to 75% of the number of mixing elements necessary for achieving homogeneous mixing of components A and B in the ratio by volume 1:1.

In all cases, components A and B are employed in a ratio by volume of at least 2:1, preferably from 2:1 to 100:1, most preferably from 5:1 to 100:1.

In a preferred embodiment, the mixing is carried out using a static mixer which has only from 40 to 50% of the number of mixing elements necessary to homogeneously mix components A and B in the ratio by volume 1:1.

The static mixer used for the mixing preferably has an internal diameter in the range from 5 to 30 mm, preferably in the range from 10 to 20 mm.

Static mixers, also known as motionless mixers, have non-moving, i.e. static, guide or mixing elements built into the flow channel. In this respect, see Perry's Chemical Engineers Handbook, 6th Edition (1984), 19–22 to 19–23. Particularly preferred static mixer designs are the Kenics mixer and the Package mixer.

Preference is given to a Kenics mixer which has only 4–18, preferably 8–12, mixing elements instead of at least 24 mixing elements necessary to homogeneously mix components A and B in the ratio by volume 1:1.

If a Package mixer is used, it preferably has only from 4 to 21, preferably from 11 to 14, mixing elements instead of at least 28 mixing elements necessary to homogeneously mix components A and B in the ratio by volume 1:1.

In the process of the invention, the mixing of components A and B is not continued until homogeneity is achieved. The reduced number of mixing elements in the mixer allows the operating pressure to be reduced, so that satisfactory discharge rates are possible using conventional spray guns.

Processing by means of static mixers only as far as a less than homogenous state results in a layered structure, the layers being formed alternately from components A and B. The consequence of this is that, due to the limitation on the diffusion, the molecular sieve-bonded curing agent of component A is not displaced in a sudden manner by the water of component B, which in turn means that the curing, preferably amine curing, of the polyurethane prepolymer only sets in gradually, while, on the other hand, the diffusing water is itself also capable of reacting with the isocyanate groups. Overall, this achieves a particularly balanced ratio between processing time and early shear strength.

The examples and comparative examples below illustrate the invention. Unless otherwise stated, parts are by weight.

I. Preparation of Component (A)

32.85 parts of phenolalkylsulphonic acid ester (plasticiser MESAMOLL® from Bayer AG), 19.00 parts of a polyether triol made from polypropylene oxide (DESMOPHEN® 1910U from Bayer AG), 13.90 parts of a polyether diol made from polypropylene oxide (DESMOPHEN® 1900U from Bayer AG), 0.10 part of p-toluenesulphonamide, 6.82 parts of diphenylmethane 4,4'-diisocyanate (DESMODUR® 44MS from Bayer AG) and 19.00 parts of carbon black (ELFTEX® 465 from Cabot) are dispersed homogeneously with warming. 0.05 parts of dibutyltin dilaurate are added, and the mixture is kept at 80° C. for 1 hour. 8.40 parts of a suspension of molecular sieve charged with ethylene-diamine are added to the hot mixture, which is then stirred until homogeneous.

The pasty mixture obtained is transferred (with exclusion of air) into cartridges.

II. Preparation of the Molecular Sieved Suspension Used in I 3.75 parts of molecular sieve powder (4 Å) are dispersed in 4.20 parts of phenolalkylsulphonic acid ester (MESAMOLL® from Bayer AG). 0.42 parts of ethylene-diamine are added, and the mixture is stirred for 48 hours.

III. Preparation of a Component (B) (Comparative Example)

3.00 parts of pyrogenic silica (AEROSIL® 200 from Degussa) are dispersed in 15.00 parts of water. The pasty mixture obtained is in turn dispersed in 70.00 parts of phenylalkylsulphonic acid ester (MESAMOLL® from Bayer AG), and the mixture obtained is adjusted to a pasty consistency by adding 15.00 parts of carbon black.

The pasty mixture obtained is transferred into cartridges.

EXAMPLES 1–6

The constituents (without water) indicated in Table I are in each case dispersed. After addition of the water, the mixture is stirred for 15 minutes. The pasty material obtained is transferred into cartridges.

TABLE I

| Constituent, parts by weight | Example | | | | | |
|---|---|---|---|---|---|---|
| | 1 | 2 | 3 | 4 | 5 | 6 |
| Native potato starch | — | — | 15 | 15 | — | — |
| Cellulose[a)] | 15 | 15 | — | — | 15 | 15 |
| Plasticizer[b)] | 60 | 65 | 60 | 65 | 60 | 60 |
| Thixotropic agent[c)] | 10 | 10 | 10 | 10 | 10 | 10 |
| Water | 15 | 10 | 15 | 10 | 10 | 10 |
| Polyol[d)] | — | — | — | — | 5 | — |
| Xylene | — | — | — | — | — | 5 |

[a)]Commercial product (XX-01 ®) from Mikro-Technik
[b)]Phenolalkylsulphonic acid ester, MESAMOLL® from Bayer AG
[c)]Carbon black, ELFTEX® 465 from Cabot
[d)]VORANOL® 450 CP from Dow The results are shown in Table II.

TABLE II

| | Processing time (max. permissible residence time in the static mixer, min.) | Gelling time, min. | Shaer strength (N/mm²) after | | |
|---|---|---|---|---|---|
| | | | 1 h | 4 h | 24 h |
| Comp. example 1 | | 2.5 | 0.5 | 4.1 | 4.3 |
| Example 1 | 10 | 20 | 0.35 | 4.1 | 4.4 |
| Example 2 | 15 | 30 | 0.2 | 3.9 | 4.6 |
| Example 3 | 10 | 20 | 0.35 | 4.0 | 4.1 |
| Example 4 | 15 | 30 | 0.2 | 3.9 | 4.6 |
| Example 5 | 15 | 20 | 1.2 | 3.9 | 4.1 |
| Example 6 | 10 | 20 | 0.5 | 4.1 | 4.4 |

Table II shows that although good shear strength is achieved after 1 hour in the comparative example, the processing time is only 1 minute since there is a risk of the mixer blocking due to gelling after this time. The processing time here is taken to mean the maximum permissible residence time in the static mixer during which the material can still be forced out by hand. The gelling time is 2.5 minutes. By contrast, the residence time in the mixer in all of Examples 1 to 6 is at least 10 minutes, with at gelling time of at least 20 minutes. The shear strength after 1 hour is adequate. After 4 hours, the same strength as in the comparative example is achieved.

What is claimed is:

1. A pasty water-containing composition comprising a carrier substance dispersed in a plasticiser that is selected from the group consisting of an alkylsulphonic acid ester of phenol, an alkylsulphonic acid ester of a cresol and benzyl butyl phthalate, the carrier substance comprising ground cellulose, starch or cork, the composition liberating water in a delayed manner after mixing with a pasty polyurethane composition comprising a polyurethane prepolymer having free isocyanate groups, and a curing agent, and wherein the ground cellulose and starch are reversibly bound to water with a weight ratio of between about 1:0.25 to 1:1.

2. The water containing composition of claim 1, wherein the composition comprises at least one material selected from the group consisting of thixotropic agent, a polyol, a wetting agent, and an aromatic solvent.

3. The water containing composition of claim 2, wherein the thixotropic agent comprises carbon black.

4. The water containing composition of claim 2. wherein the aromatic solvent is selected from the group consisting of toluene and xylene.

5. The water-containing composition according to claim 1 wherein the carrier substance is a particulate material.

6. A pasty water-containing composition containing water reversibly bonded to a carrier substance which is selected from the group consisting of ground cellulose, starch and cork, and which is dispersed in a viscous liquid selected from the group consisting of an alkylsulphonic acid ester of phenol, an alkylsulphonic acid ester of cresol and benzyl butyl phthalate, the carrier substance liberating the water in a delayed manner after mixing the composition with a pasty polyurethane composition comprising a polyurethane prepolymer having free isocyanate groups and a blocked curing agent which is liberated by water, in order to prepare a cured sealant, the viscous liquid being a plasticiser for the cured sealant, the ratio by weight between the carrier substance and water in the water-containing composition being from 1:0.25 to 1:1.

7. The composition of claim 6 wherein the composition comprises at least one material selected from the group consisting of thixotropic agent, a polyol, a wetting agent, and an aromatic solvent.

8. The composition of claim 6 wherein the thixotropic agent comprises carbon black.

9. The composition of claim 6 wherein the aromatic solvent is selected from the group consisting of toluene and xylene.

* * * * *